(12) United States Patent
Jones et al.

(10) Patent No.: US 9,914,402 B1
(45) Date of Patent: Mar. 13, 2018

(54) ROD AND REEL CARRIER AND UTILITY BOX SYSTEM

(71) Applicants: Vincent Jones, Houston, TX (US); Lee Haynes, Houston, TX (US)

(72) Inventors: Vincent Jones, Houston, TX (US); Lee Haynes, Houston, TX (US)

(*) Notice: Subject to any disclaimer, the term of this patent is extended or adjusted under 35 U.S.C. 154(b) by 0 days.

(21) Appl. No.: 14/716,924

(22) Filed: May 20, 2015

Related U.S. Application Data

(60) Provisional application No. 62/013,367, filed on Jun. 17, 2014.

(51) Int. Cl.
| | |
|---|---|
| *B60R 7/08* | (2006.01) |
| *B60R 9/08* | (2006.01) |
| *B60R 9/06* | (2006.01) |
| *A01K 97/10* | (2006.01) |
| *A01K 97/08* | (2006.01) |
| *A47B 81/00* | (2006.01) |

(52) U.S. Cl.
CPC ............ *B60R 9/08* (2013.01); *A01K 97/08* (2013.01); *A01K 97/10* (2013.01); *A47B 81/005* (2013.01); *B60R 9/065* (2013.01)

(58) Field of Classification Search
CPC ........ A01K 97/10; A01K 99/00; A01K 97/08; A47B 81/005; B60R 9/08; B60R 7/08; B60R 2011/004; B60R 2011/0042; B60R 2011/005; B60R 2011/0052
USPC .................. 224/404, 401, 402, 922
See application file for complete search history.

(56) References Cited

U.S. PATENT DOCUMENTS

| | | | | |
|---|---|---|---|---|
| 1,609,666 | A | * | 12/1926 | Settevig ............... A47L 13/512 248/113 |
| D190,429 | S | * | 5/1961 | Hoagland ..................... 131/256 |
| 3,635,433 | A | * | 1/1972 | Anderson .............. A01K 97/08 211/70.8 |
| 4,170,801 | A | | 10/1979 | Ward |
| 4,293,113 | A | * | 10/1981 | Gray ...................... A01K 97/10 224/482 |
| 4,770,327 | A | * | 9/1988 | Fortson .................. A01K 97/06 220/533 |
| 4,858,366 | A | | 8/1989 | Rushton |
| 4,953,318 | A | * | 9/1990 | Vasseur, Jr. ............ A01K 97/10 211/195 |
| 5,088,636 | A | * | 2/1992 | Barajas ................... B60R 11/06 224/281 |
| 5,183,164 | A | * | 2/1993 | Heinzle ................ A63C 11/028 211/70.5 |
| 5,205,446 | A | * | 4/1993 | Greenberg ................ B60R 9/02 224/497 |
| 5,299,722 | A | * | 4/1994 | Cheney ..................... B60R 7/14 206/317 |
| 5,310,103 | A | * | 5/1994 | Weber ..................... B60R 11/06 224/311 |
| 5,347,746 | A | * | 9/1994 | Letson ................... A01K 97/06 206/315.11 |
| 5,435,473 | A | * | 7/1995 | Larkum .................... B60R 9/08 211/4 |

(Continued)

*Primary Examiner* — Brian D Nash
(74) *Attorney, Agent, or Firm* — RG Patent Consulting, LLC; Rachel Gilboy

(57) ABSTRACT

The rod & reel carrier and utility box assembly is a storage box insert for a full-sized pickup bed, which is able to secure multiple rod and reels for transport, combined with a storage utility box with locking, hinged cover for storing any manner of fishing accessories, and items of use.

13 Claims, 5 Drawing Sheets

(56) References Cited

U.S. PATENT DOCUMENTS

| | | | | |
|---|---|---|---|---|
| 5,484,092 A | * | 1/1996 | Cheney | B60R 7/14 |
| | | | | 206/317 |
| 5,588,542 A | * | 12/1996 | Winkler, Jr. | A47B 81/005 |
| | | | | 211/70.8 |
| 5,601,206 A | * | 2/1997 | Haas | B60R 9/00 |
| | | | | 16/254 |
| 5,678,700 A | * | 10/1997 | Crosson, Jr. | A47B 81/005 |
| | | | | 211/60.1 |
| 5,813,164 A | * | 9/1998 | Liberto | A01K 97/10 |
| | | | | 43/21.2 |
| 5,964,492 A | * | 10/1999 | Lyon | B60R 9/00 |
| | | | | 224/404 |
| 6,052,939 A | * | 4/2000 | McClain | A01K 97/22 |
| | | | | 206/315.11 |
| 6,595,376 B1 | * | 7/2003 | Lin | A47L 13/512 |
| | | | | 211/66 |
| 6,811,067 B2 | * | 11/2004 | Muizelaar | B62D 33/027 |
| | | | | 224/404 |
| 7,219,464 B1 | * | 5/2007 | Kujawa | A01K 97/08 |
| | | | | 211/70.8 |
| 7,322,149 B1 | * | 1/2008 | Quintero | A01K 97/08 |
| | | | | 206/315.11 |
| 7,472,510 B1 | * | 1/2009 | Fasola | A01K 97/08 |
| | | | | 43/21.2 |
| 7,503,459 B2 | * | 3/2009 | Grayson | A47B 81/005 |
| | | | | 211/70.8 |
| 9,307,838 B1 | * | 4/2016 | Blavat | A01K 97/10 |
| 2011/0204109 A1 | | 8/2011 | Knutson | |
| 2016/0023691 A1 | * | 1/2016 | Bales | B60R 9/06 |
| | | | | 296/37.6 |

* cited by examiner

ROD AND REEL CARRIER AND UTILITY BOX SYSTEM

CROSS-REFERENCE TO RELATED APPLICATION

The present application is related to and claims priority from prior provisional application Ser. No. 62/013,367, filed Jun. 17, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of fishing accessories and more specifically relates to a rod & reel carrier & utility box.

2. Description of the Related Art

Fishing offers something for everyone. Some anglers enjoy the physical activity of fly-fishing or surf-fishing, two forms of fishing that put the angler into the water, where a considerable element of athleticism is required. Some anglers prefer the quiet contemplation afforded by slow and steady pier-fishing, where one casts out a baited rig and then waits, quite often enjoying their favorite beverage, for a fish to strike. Still others enjoy trolling from boats. A day's fishing forces the mind to relax in a channel of concentration and enjoyment.

Fishing is one of life's great pastimes, but as with anything, there are certain drawbacks. In fishing, one drawback is the sheer amount of things you have to carry. Ice-chest, bait, tackle, drinks, rods and reels, pliers, knives and of course spares for everything you might break or lose. The list is long; and among all of these things, the one thing you most want to protect, to keep from getting twisted or broken, tangled up and banged up, is your fishing rods and reels. An efficient means for handling and storing fishing items is desirable.

Various attempts have been made to solve the above-mentioned problems such as those found in U.S. Publication No. 2011/0204109 to Curt R. Knutson; U.S. Pat. No. 4,170,801 to Milton K. Ward; and U.S. Pat. No. 4,858,366 to Richard T. Rushton. This art is representative of fishing accessories. None of the above inventions and patents, taken either singly or in combination, is seen to describe the invention as claimed.

Ideally, a rod & reel carrier should provide ease of use and be durable, yet would operate reliably and be manufactured at a modest expense. Thus, a need exists for a reliable rod & reel carrier & utility box system to avoid the above-mentioned problems.

BRIEF SUMMARY OF THE INVENTION

In view of the foregoing disadvantages inherent in the known fishing accessories art, the present invention provides a novel rod & reel carrier & utility box. The general purpose of the present invention, which will be described subsequently in greater detail is to provide a form-fitting storage box insert for the beds of full-size pickups, designed to hold, separate, and secure multiple fishing rods and reels in place for transport.

A rod & reel carrier & utility box system is disclosed herein, in a preferred embodiment, comprising: a rod and reel carrier and utility box assembly having a utility box, a hinged top cover, a bottom storage box, an inner volume, and mount holes. The present invention further comprises a rod and reel carrier having a rod frame, a series of rod receptacles, and a plurality of rod retainers. The rod and reel carrier and utility box assembly may be manufactured with a lightweight and durable aluminum, to allow use in substantially any weather condition such that corrosion is minimized and so it is reasonably lightweight for use. The rod & reel carrier & utility box assembly is able to be easily installed, and alternately removed from a truck bed as needed via the included adjustable clamps and mount holes. It provides convenient access to fishing equipment as needed, and is able to secure a plurality of rod and reels for storage and transport. Further, the device keeps rod and reels separated to minimize bumps and tangling, for convenience.

The utility box comprises a hinged top cover, a bottom storage box, an inner volume, and mount holes in combination, as mentioned. The rod and reel carrier comprises a rod frame, a series of rod receptacles, and a plurality of rod retainers. The series of rod receptacles are fixably attached to the rod frame for placement of rod and reels for transportation as needed. The series of rod receptacles are further cushioned to minimize the bumping and jarring effects on rod and reels placed therein. The rod frame is weldably attached to the rod and reel carrier, and is recessed to allow staggering of the series of rod receptacles for secure placement of rod and reels.

The hinged top cover is fixably and pivotally attached to the bottom storage box, and has a lock to deter theft of items stored within the inner volume. The inner volume of the bottom storage box is able to accept items of use for storage until needed by a user. The mount holes align with truck fenders to allow mounting of the rod and reel carrier and utility box assembly to a truck bed for use. The rod frame is welded to the utility box, and the series of rod receptacles are mounted to the rod frame, to allow placement of rod and reels as needed.

The series of rod retainers are pivotally attached to the rod frame, which allows opening of the series of rod retainers for placement of rod and reels within the rod receptacles. The plurality of rod retainers span the length of the rod frame to individually secure each rod and reel as needed, and comprise a light gauge, molded, flat strap of ferrous material, for longevity of use and security. The plurality of rod retainers is able to securely hold rod and reels within the series of rod receptacles, and deters theft while in-use, and further provide support for rod and reels. The rod and reel carrier and utility box assembly allows secure placement of rod and reels, and the utility box allows placement of fishing accessories, and other items of use, until needed by a user.

The present invention holds significant improvements and serves as a storage box insert for a pick up bed which is able to secure multiple rod and reels for transport. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, rod & reel carrier and utility box system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to fishing accessories and more particularly to a form-fitting storage box insert for the beds of full-size pickups, designed to hold, separate, and secure multiple fishing rods and reels in place for transport as used to improve the ability of a user to securely store, and alternately transport fishing rod and reels and related gear to a desired location for use.

Generally speaking, the rod & reel carrier and utility box assembly is a storage box insert for a full-sized pickup bed, which is able to secure multiple rod and reels for transport, combined with a storage utility box with locking, hinged cover for storing any manner of fishing accessories, and items of use.

Figure 1:
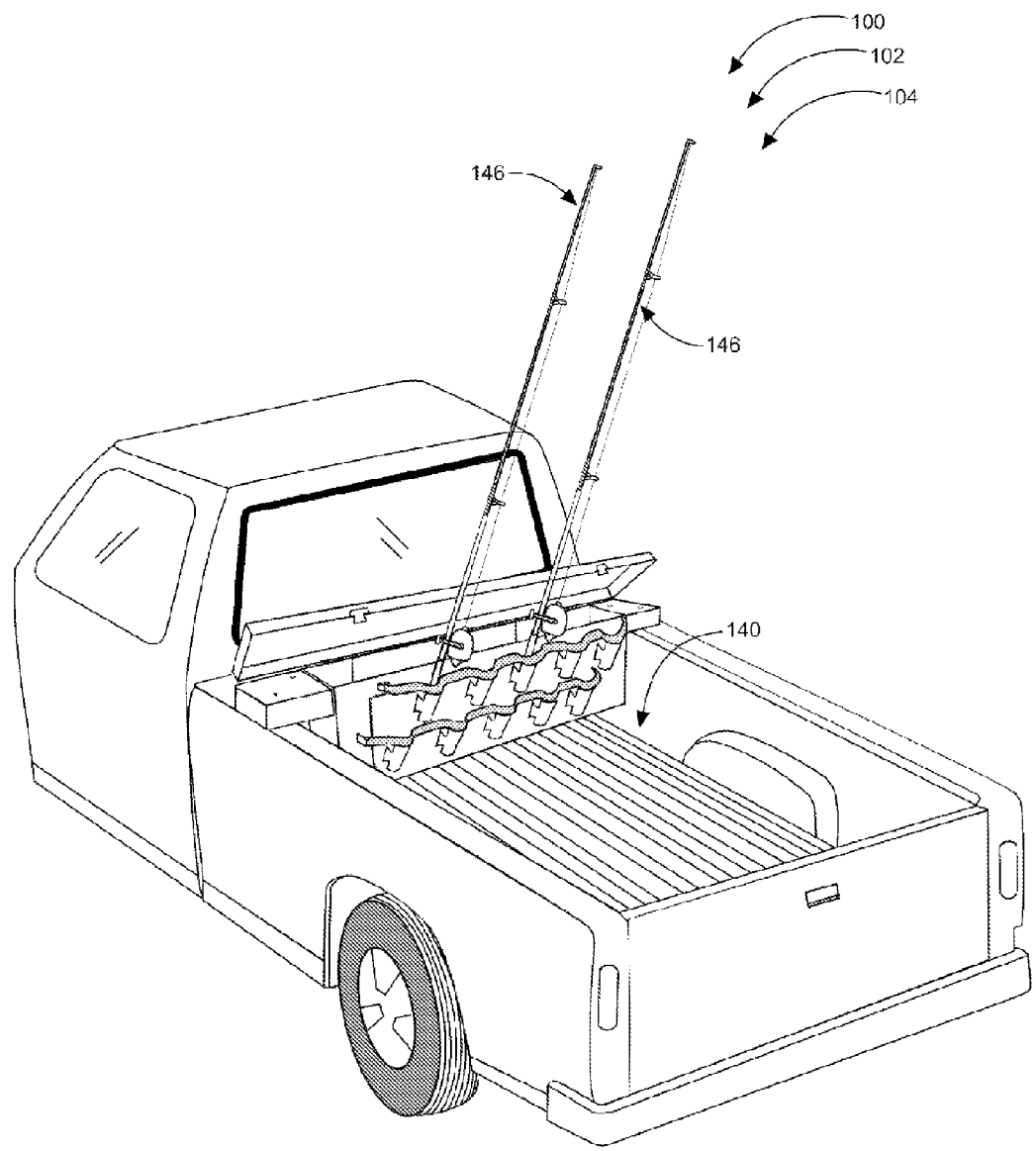
FIG. 1 shows a perspective view illustrating a rod & reel carrier and utility box system in an in-use condition, according to an embodiment of the present invention.

Referring to the drawings by numerals of reference there is shown in FIG. 1, a perspective view illustrating rod & reel carrier and utility box system 100 in an in-use condition 104 according to an embodiment of the present invention.

Rod & reel carrier & utility box system 100 comprises: rod and reel carrier and utility box assembly 102 having utility box 110 with hinged top cover 112, bottom storage box 114, inner volume 116, and mount holes 118. The device further comprises rod and reel carrier 124 having rod frame 126, series of rod receptacles 128, and plurality of rod retainers 131. The rod and reel carrier and utility box assembly 102 may be manufactured with lightweight and durable aluminum 106, to allow use in substantially any weather condition such that corrosion is minimized; other materials may be used. The rod & reel carrier & utility box assembly 102 is able to be easily installed, and alternately removed from truck bed 140 as needed, due to the included adjustable clamps 120 and mount holes 118. As such the present invention provides convenient access to fishing equipment as needed, and is able to secure a plurality of rod and reels 146 for storage and transport. It further keeps rod and reels 146 separated to minimize bumps and tangling, for convenience.

Figure 2:
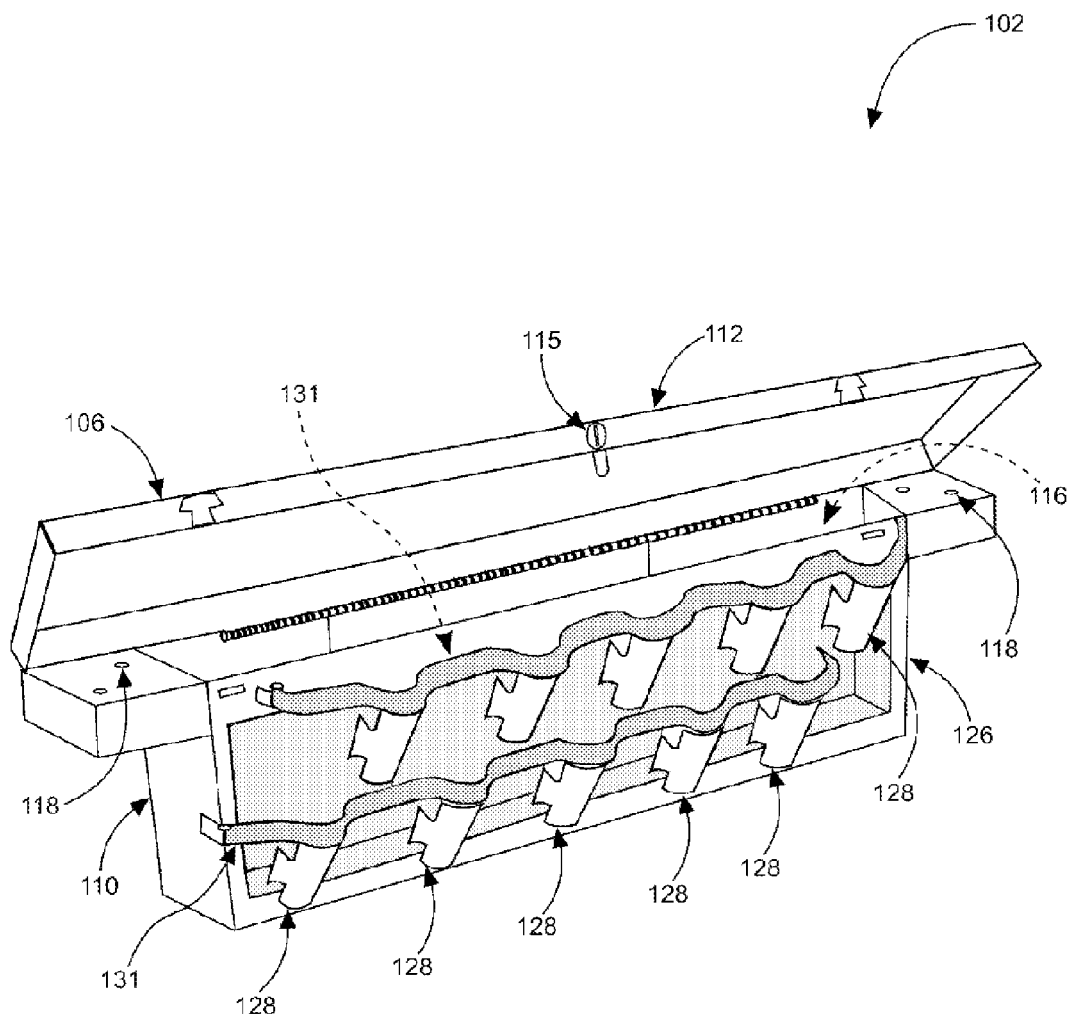
FIG. 2 is a perspective view illustrating a rod & reel carrier and utility box assembly with an open hinged top cover, showing the inner volume, according to an embodiment of the present invention of FIG. 1.

Referring now to FIG. 2, a perspective view illustrating rod & reel carrier and utility box assembly 102 with open hinged top cover 112, showing inner volume 116 according to an embodiment of the present invention.

Utility box 110 comprises hinged top cover 112, bottom storage box 114, inner volume 116, and mount holes 118 in combination. Rod and reel carrier 124 comprises rod frame 126, series of rod receptacles 128, and plurality of rod retainers 131. Series of rod receptacles 128 are fixably attached to rod frame 126 for placement of rod and reels 146 for transportation as needed. Series of rod receptacles 128 are further cushioned to minimize the bumping and jarring effects on rod and reels 146 placed therein. Rod frame 126 is weldably 9or otherwise attached or integral) attached to rod and reel carrier 124, and is recessed to allow staggering of series of rod receptacles 128 for secure placement of rod and reels 146.

Figure 3:
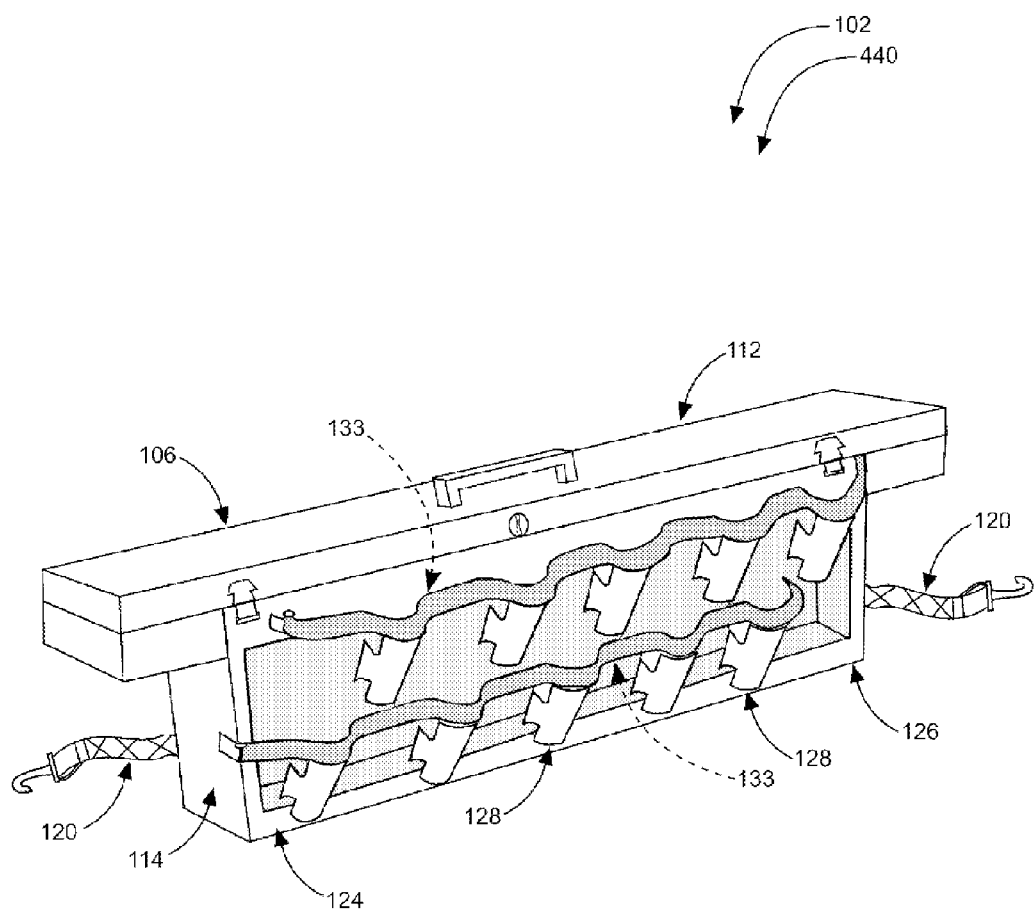
FIG. 3 is a perspective view illustrating rod & reel carrier and utility box assembly with a closed hinged top cover, according to an embodiment of the present invention of FIG. 1.

Referring now to FIG. 3, a perspective view illustrating rod & reel carrier and utility box assembly 102 with closed hinged top cover 112 according to an embodiment of the present invention.

Hinged top cover 112 is fixably and pivotally attached to bottom storage box 114, and has lock 115 to deter theft of items within inner volume 116. Inner volume 116 of bottom storage box 114 is able to accept items of use for storage until needed by a user. Mount holes 118 align with truck fenders to allow mounting of rod and reel carrier and utility box assembly 102 to truck bed 140 for use. Rod frame 126 is welded to utility box 110, and series of rod receptacles 128 are mounted to rod frame 126, to allow placement of rod and reels 146 as needed.

Figure 4:
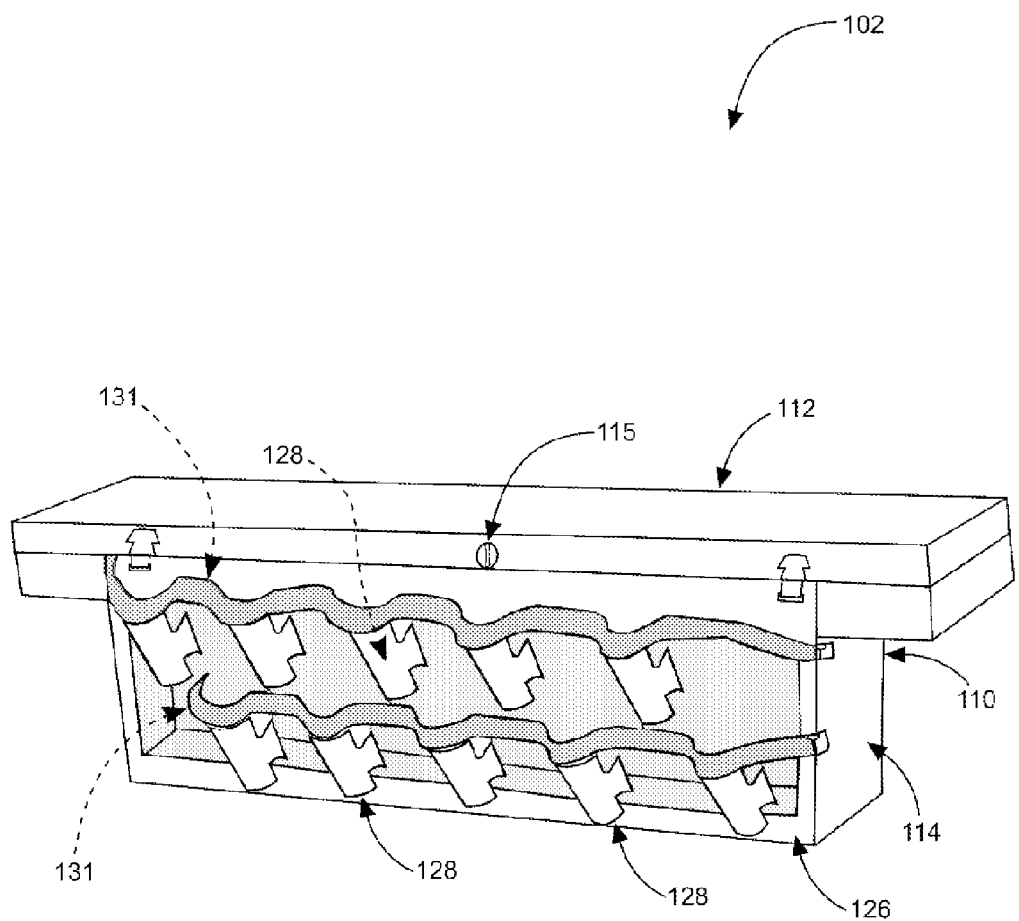
FIG. 4 is another perspective view illustrating the rod & reel carrier and utility box assembly, according to an embodiment of the present invention of FIG. 1.

Referring now to FIG. 4, showing another perspective view of rod & reel carrier and utility box system 100 according to an embodiment of the present invention.

Plurality of rod retainers 131 are pivotally attached to rod frame 126, which allows opening of plurality of rod retainers 131 for placement of rod and reels 146 within series rod receptacles 128. Plurality of rod retainers 131 span the length of rod frame 126 to individually secure each rod and reel 146 as needed, and comprise a light gauge, molded, strap of ferrous material 133, for longevity of use and security. Plurality of rod retainers 131 are able to securely hold rod and reels 146 within series of rod receptacles 128, and deters theft while in-use, and further provides support for rod and reels 146. Rod and reel carrier and utility box assembly 102 allows secure placement of rod and reels 146, and utility box 110 allows placement of fishing accessories, and other items of use, until needed by a user.

Rod & reel carrier and utility box system 100 may be sold as kit 440 comprising the following parts: at least one utility box 110; at least one rod and reel carrier 124; at least one series of rod receptacles 128; at least one plurality of rod retainers 131; and at least one set of user instructions. The kit has instructions such that functional relationships are detailed in relation to the structure of the invention (such that the invention can be used, maintained, or the like in a preferred manner). Rod & reel carrier & utility box system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different retaining combinations, parts may be sold separately, etc., may be sufficient.

Figure 5:
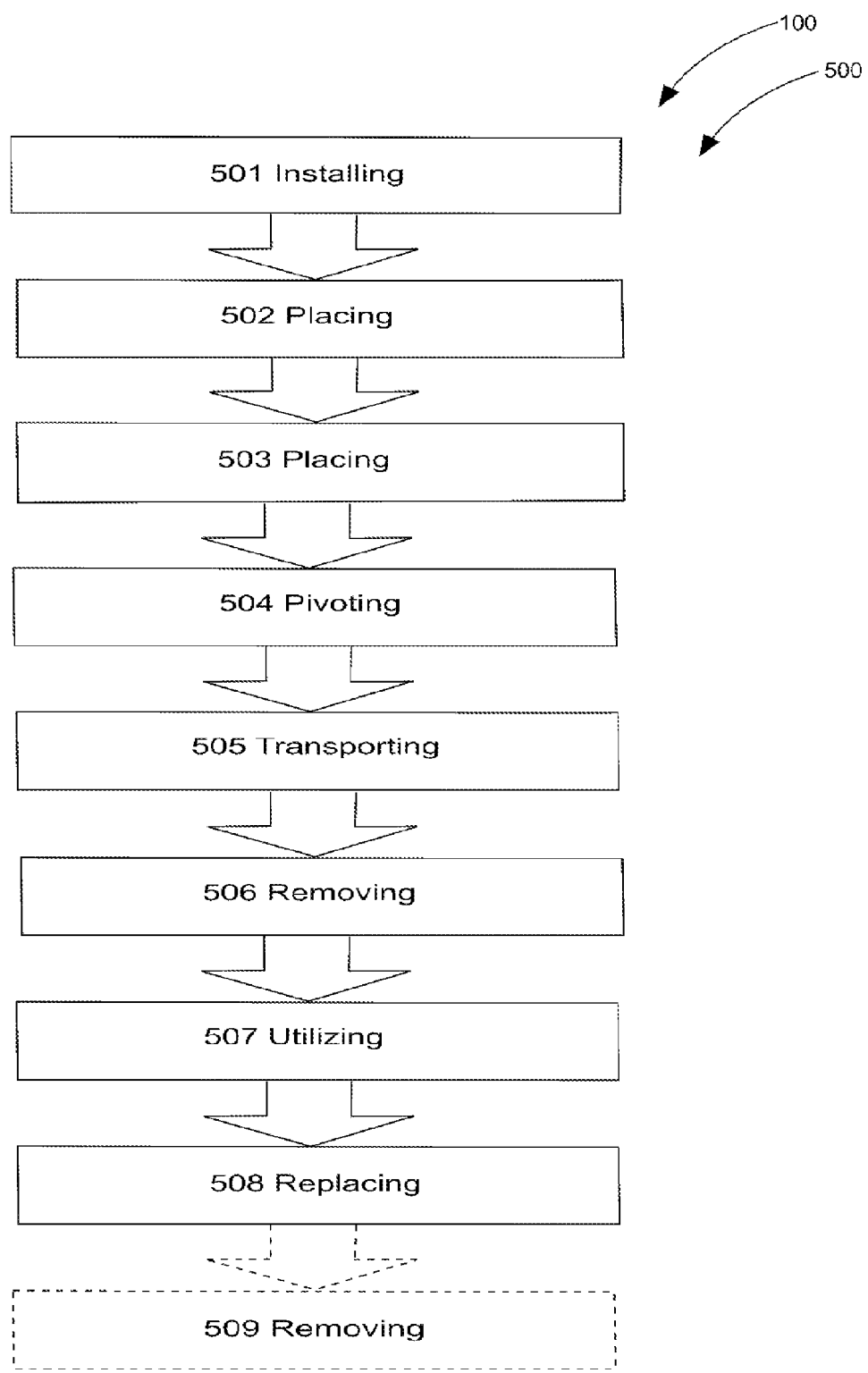
FIG. 5 is a flowchart illustrating a method of use for the rod & reel carrier and utility box system according to an embodiment of the present invention of FIGS. 1-4.

Referring now to FIG. 5, showing a flowchart illustrating a method of use 500 for rod & reel carrier and utility box system 100 according to an embodiment of the present invention of FIGS. 1-4.

Step one 501 installing a rod & reel carrier & utility box assembly 102 in a truck bed 140, step two 502 placing items of use in a utility box 110, step three 503 placing rod and reels 146 in series of rod receptacles 128, step four 504 pivoting plurality of rod retainers 131 to a closed position, step five 505 transporting rod & reel carrier & utility box assembly 102 to a desired location, step six 506 removing rod and reels 146 for use, step seven 507 using rod and reels 146 as necessary, step eight 508 replacing rod and reels 146 in series of rod receptacles 128, and step nine 509 removing rod & reel carrier & utility box assembly 102 from truck bed 140 after use.

It should be noted that step 509 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A rod and reel carrier and utility box system comprising:
    a rod and reel carrier and utility box assembly having;
        a utility box having;
            a hinged top cover;
            a bottom storage box;
            an inner volume; and
            mount holes;
        a rod and reel carrier having;
            a rod frame;
            a series of rod receptacles; and
            a plurality of rod retainers;
    wherein said hinged top cover is fixably and pivotally attached to said bottom storage box;
    wherein said inner volume of said bottom storage box is able to accept items of use for storage until needed by a user;
    wherein said mount holes align with truck fenders to allow mounting of said rod and reel carrier and utility box assembly to a truck bed for use;
    wherein said rod frame is weldably mounted to said utility box for use;
    wherein said series of rod receptacles are fixably mounted to said rod frame to allow placement of said rod and reels for use;
    wherein said series of rod retainers is pivotally attached to said rod frame, which allows opening of said series of rod retainers for placement of said rod and reels within said rod receptacles;
    wherein said plurality of rod retainers provide support for said rod and reels while in-use; and
    wherein said rod and reel carrier and utility box assembly allows secure placement of said rod and reels, and said utility box allows placement of fishing accessories, and alternately other items of use, until needed by said user;
    wherein said rod and reel carrier and utility box assembly is manufactured with a lightweight and durable aluminum to allow use in substantially any weather condition such that corrosion is minimized;
    wherein said rod and reel carrier and utility box assembly is able to secure a plurality of said rod and reels for storage and transport as needed;
    wherein said rod and reel carrier and utility box assembly keeps said rod and reels separated to minimize bumps and tangling;
    wherein said rod & reel carrier & utility box assembly is able to be easily installed and alternately removed from said truck bed as needed; and
    wherein said rod and reel carrier and utility box assembly is able to be secured between side rails of said truck bed with adjustable clamps.

2. The rod and reel carrier and utility box system of claim 1 wherein said series of rod receptacles are fixably attached to said rod frame for placement of said rod and reels for transportation.

3. The rod and reel carrier and utility box system of claim 2 wherein said rod frame is weldably attached to said rod and reel carrier.

4. The rod and reel carrier and utility box system of claim 3 wherein said rod frame is recessed to allow staggering of said series of rod receptacles for secure placement of said rod and reels.

5. The rod and reel carrier and utility box system of claim 2 wherein said series of rod receptacles are cushioned to minimize bumping and jarring effects on said rod and reels.

6. The rod and reel carrier and utility box system of claim 1 wherein said hinged top cover comprises a lock to deter theft of items within said inner volume.

7. The rod and reel carrier and utility box system of claim 1 wherein said plurality of rod retainers is able to securely hold said rod and reels within said series of rod receptacles.

8. The rod and reel carrier and utility box system of claim 7 wherein said plurality of rod retainers deters theft of said rod and reels while in-use.

9. The rod and reel carrier and utility box system of claim 8 wherein said plurality of rod retainers span the length of said rod frame to individually secure each said rod and reel as needed.

10. The rod and reel carrier and utility box system of claim 9 wherein said plurality of rod retainers comprise a light gauge, moulded, flat strap of ferrous material for longevity of use and security of said rod and reels.

11. The rod and reel carrier and utility box system of claim 1 wherein said rod and reel carrier and utility box assembly provides convenient access to said fishing equipment as needed.

12. A rod & reel carrier & utility box system comprising:
   a rod and reel carrier and utility box assembly having;
      a utility box having;
         a hinged top cover;
         a bottom storage box;
         an inner volume; and
         mount holes;
      a rod and reel carrier having;
         a rod frame;
         a series of rod receptacles; and
         a plurality of rod retainers; and
   a kit including: at least one said utility box, at least one said rod and reel carrier, at least one said series of rod receptacles, at least one said plurality of rod retainers, and at least one set of user instructions for use;
   wherein said rod and reel carrier and utility box assembly is manufactured with a lightweight and durable aluminum to allow use in substantially any weather condition such that corrosion is minimized;
   wherein said rod & reel carrier & utility box assembly is able to be easily installed and alternately removed from said truck bed as needed;
   wherein said rod and reel carrier and utility box assembly is able to be secured between side rails of said truck bed with adjustable clamps;
   wherein said rod and reel carrier and utility box assembly provides convenient access to said fishing equipment as needed;
   wherein said rod and reel carrier and utility box assembly is able to secure a plurality of said rod and reels for storage and transport as needed;
   wherein said rod and reel carrier and utility box assembly keeps said rod and reels separated to minimize bumps and tangling;
   wherein said series of rod receptacles are fixably attached to said rod frame for placement of said rod and reels for transportation;
   wherein said series of rod receptacles are cushioned to minimize bumping and jarring effects on said rod and reels;
   wherein said rod frame is weldably attached to said rod and reel carrier;
   wherein said rod frame is recessed to allow staggering of said series of rod receptacles for secure placement of said rod and reels;
   wherein said hinged top cover is fixably and pivotally attached to said bottom storage box;
   wherein said hinged top cover comprises a lock to deter theft of items within said inner volume;
   wherein said inner volume of said bottom storage box is able to accept items of use for storage until needed by a user;
   wherein said mount holes align with truck fenders to allow mounting of said rod and reel carrier and utility box assembly to a truck bed for use;
   wherein said rod frame is weldably mounted to said utility box for use;
   wherein said series of rod receptacles are fixably mounted to said rod frame to allow placement of said rod and reels for use;
   wherein said series of rod retainers is pivotally attached to said rod frame, which allows opening of said series of rod retainers for placement of said rod and reels within said rod receptacles;
   wherein said plurality of rod retainers span the length of said rod frame to individually secure each said rod and reel as needed;
   wherein said plurality of rod retainers comprise a light gauge, moulded, flat strap of ferrous material for longevity of use and security of said rod and reels;
   wherein said plurality of rod retainers is able to securely hold said rod and reels within said series of rod receptacles;
   wherein said plurality of rod retainers deters theft of said rod and reels while in-use;
   wherein said plurality of rod retainers provide support for said rod and reels while in-use; and
   wherein said rod and reel carrier and utility box assembly allows secure placement of said rod and reels, and said utility box allows placement of fishing accessories, and alternately other items of use, until needed by said user.

13. A rod and reel carrier and utility box system comprising:
   a rod and reel carrier and utility box assembly having;
      a utility box having;
         a hinged top cover;
         a bottom storage box;
         an inner volume; and
         mount holes;
      a rod and reel carrier having;
         a rod frame;
         a series of rod receptacles; and
         a plurality of rod retainers;
   wherein said hinged top cover is fixably and pivotally attached to said bottom storage box;
   wherein said inner volume of said bottom storage box is able to accept items of use for storage until needed by a user;
   wherein said mount holes align with truck fenders to allow mounting of said rod and reel carrier and utility box assembly to a truck bed for use;
   wherein said rod frame is weldably mounted to said utility box for use;
   wherein said series of rod receptacles are fixably mounted to said rod frame to allow placement of said rod and reels for use;
   wherein said series of rod retainers is pivotally attached to said rod frame, which allows opening of said series of rod retainers for placement of said rod and reels within said rod receptacles;
   wherein said plurality of rod retainers provide support for said rod and reels while in-use; and wherein said rod and reel carrier and utility box assembly allows secure placement of said rod and reels, and said utility box allows placement of fishing accessories, and alternately other items of use, until needed by said user;

wherein said plurality of rod retainers is able to securely hold said rod and reels within said series of rod receptacles;

wherein said plurality of rod retainers deters theft of said rod and reels while in-use;

wherein said plurality of rod retainers span the length of said rod frame to individually secure each said rod and reel as needed; and wherein said plurality of rod retainers comprise a light gauge, moulded, flat strap of ferrous material for longevity of use and security of said rod and reels.

* * * * *